United States Patent
Pedersen et al.

(10) Patent No.: US 9,321,014 B2
(45) Date of Patent: Apr. 26, 2016

(54) HOLLOW FIBER MEMBRANE WITH COMPATIBLE REINFORCEMENTS

(75) Inventors: Steven Kristian Pedersen, Burlington (CA); Pierre Lucien Cote, Dundas (CA); Jinhua Bai, Burlington (CA)

(73) Assignee: BL TECHNOLOGIES, INC., Trevose, PA (US)

( * ) Notice: Subject to any disclaimer, the term of this patent is extended or adjusted under 35 U.S.C. 154(b) by 665 days.

(21) Appl. No.: 13/328,761

(22) Filed: Dec. 16, 2011

(65) Prior Publication Data

US 2013/0153490 A1 Jun. 20, 2013

(51) Int. Cl.
| | |
|---|---|
| *B01D 39/00* | (2006.01) |
| *B01D 39/14* | (2006.01) |
| *B29C 67/00* | (2006.01) |
| *B29C 47/12* | (2006.01) |
| *B29C 47/00* | (2006.01) |
| *B29C 47/88* | (2006.01) |
| *B01D 69/08* | (2006.01) |
| *B01D 71/34* | (2006.01) |

(52) U.S. Cl.
CPC .............. *B01D 69/08* (2013.01); *B01D 69/085* (2013.01); *B01D 71/34* (2013.01); *B01D 2323/42* (2013.01); *B01D 2325/40* (2013.01)

(58) Field of Classification Search
CPC ........ B01D 69/08; B01D 71/34; B01D 71/68; D01F 1/07; D01D 5/38
USPC ....... 210/500.23, 500.41, 500.36; 264/178 R, 264/177.14, 171.26; 442/60, 269, 366; 118/75; 428/364
See application file for complete search history.

(56) References Cited

U.S. PATENT DOCUMENTS

| | | | |
|---|---|---|---|
| 2,747,649 A | 5/1956 | Reed | |
| 2,936,482 A | 5/1960 | Kilian | |
| 3,494,121 A | 2/1970 | Bohrer | |
| 3,547,721 A | 12/1970 | Dietzsch | |
| 3,567,666 A | 3/1971 | Berger | |
| 3,615,024 A | 10/1971 | Michaels | |
| 3,673,028 A | 6/1972 | Pearson | |
| 3,676,193 A | 7/1972 | Cooper et al. | |
| 3,705,070 A * | 12/1972 | Kim | ............................... 428/112 |
| 3,745,142 A | 7/1973 | Mahlman | |

(Continued)

FOREIGN PATENT DOCUMENTS

| | | |
|---|---|---|
| CA | 986422 | 3/1976 |
| CA | 2288316 | 5/2000 |

(Continued)

OTHER PUBLICATIONS

Jie Liu, Pingli Li et al. Preparation of PET threads reinforced PVDF hollow fiber membrane, Desalination, vol. 249, Issue 2, Dec. 15, 2009, pp. 453-457.

(Continued)

*Primary Examiner* — Ana Fortuna

(57) ABSTRACT

A process of making a reinforced hollow fiber membrane comprises flowing a membrane dope through a casting head while drawing one or more yarns or tows of filaments through the casting head. The filaments are spread apart in the casting head, for example by forcing the yarns or tows around a bend or through a narrow gap in the casting head. The filaments are adapted to bond to the membrane dope or the membrane wall. A reinforced hollow fiber membrane comprises a plurality of filaments individually surrounded by, and bonded to, the membrane wall.

19 Claims, 3 Drawing Sheets

(56) References Cited

U.S. PATENT DOCUMENTS

| | | | | |
|---|---|---|---|---|
| 3,816,231 A | * | 6/1974 | Marshall | 442/366 |
| 3,849,241 A | | 11/1974 | Butin et al. | |
| 3,948,781 A | | 4/1976 | Brun et al. | |
| 3,984,328 A | | 10/1976 | Brun et al. | |
| 4,020,230 A | | 4/1977 | Mahoney et al. | |
| 4,029,265 A | | 6/1977 | Piper | |
| 4,061,821 A | | 12/1977 | Hayano et al. | |
| 4,115,492 A | | 9/1978 | Mahoney et al. | |
| 4,247,498 A | | 1/1981 | Castro | |
| 4,253,936 A | | 3/1981 | Leysen et al. | |
| 4,274,539 A | | 6/1981 | Rabeneck et al. | |
| 4,299,083 A | | 11/1981 | Igel et al. | |
| 4,335,193 A | | 6/1982 | Doi et al. | |
| 4,340,480 A | | 7/1982 | Pall et al. | |
| 4,384,047 A | | 5/1983 | Benzinger et al. | |
| 4,399,035 A | | 8/1983 | Nohmi et al. | |
| 4,405,688 A | | 9/1983 | Lowery et al. | |
| 4,406,850 A | | 9/1983 | Hills | |
| 4,541,981 A | | 9/1985 | Lowery et al. | |
| 4,631,128 A | | 12/1986 | Coplan et al. | |
| 4,664,681 A | | 5/1987 | Anazawa et al. | |
| 4,666,607 A | | 5/1987 | Josefiak et al. | |
| 4,702,836 A | | 10/1987 | Mutoh et al. | |
| 4,707,265 A | | 11/1987 | Barnes, Jr. et al. | |
| 4,741,829 A | | 5/1988 | Takemura et al. | |
| 4,764,320 A | | 8/1988 | Chan et al. | |
| 4,919,856 A | | 4/1990 | Anazawa et al. | |
| 4,957,943 A | | 9/1990 | McAllister et al. | |
| 5,011,588 A | | 4/1991 | Rao et al. | |
| 5,013,339 A | | 5/1991 | Mahoney et al. | |
| 5,022,990 A | | 6/1991 | Doi et al. | |
| 5,032,282 A | | 7/1991 | Linder et al. | |
| 5,034,129 A | | 7/1991 | Ten Hove | |
| 5,066,401 A | | 11/1991 | Muller et al. | |
| 5,139,529 A | | 8/1992 | Seita et al. | |
| 5,143,312 A | | 9/1992 | Baurmeister | |
| 5,151,191 A | | 9/1992 | Sunaoka et al. | |
| 5,168,005 A | | 12/1992 | Keating | |
| 5,171,493 A | | 12/1992 | Aptel et al. | |
| 5,209,852 A | | 5/1993 | Sunaoka et al. | |
| 5,232,597 A | | 8/1993 | Eguchi | |
| 5,232,642 A | | 8/1993 | Kamo et al. | |
| 5,238,562 A | | 8/1993 | Rogut | |
| 5,240,610 A | | 8/1993 | Tani et al. | |
| 5,271,883 A | | 12/1993 | Timmons et al. | |
| 5,284,583 A | | 2/1994 | Rogut | |
| 5,294,338 A | | 3/1994 | Kamo et al. | |
| 5,303,550 A | | 4/1994 | Setzer | |
| 5,328,610 A | | 7/1994 | Rogut | |
| 5,332,498 A | | 7/1994 | Rogut | |
| 5,336,298 A | | 8/1994 | Quinn et al. | |
| 5,374,453 A | | 12/1994 | Swei et al. | |
| 5,376,273 A | | 12/1994 | Pacheco et al. | |
| 5,380,477 A | * | 1/1995 | Kent et al. | 264/103 |
| 5,385,777 A | | 1/1995 | Higuchi et al. | |
| 5,392,588 A | * | 2/1995 | Morrison | 57/328 |
| 5,435,955 A | | 7/1995 | Kamei et al. | |
| 5,470,659 A | | 11/1995 | Baumgart et al. | |
| 5,472,607 A | | 12/1995 | Mailvaganam et al. | |
| 5,474,680 A | | 12/1995 | Eguchi | |
| 5,489,406 A | | 2/1996 | Beck et al. | |
| 5,497,608 A | | 3/1996 | Matsumoto et al. | |
| 5,547,756 A | | 8/1996 | Kamo et al. | |
| 5,582,913 A | * | 12/1996 | Simons | 428/373 |
| 5,637,385 A | | 6/1997 | Mizuki et al. | |
| 5,651,888 A | | 7/1997 | Shimizu et al. | |
| 5,656,167 A | | 8/1997 | Martz | |
| 5,709,735 A | | 1/1998 | Midkiff et al. | |
| 5,716,689 A | | 2/1998 | Rogut | |
| 5,753,351 A | | 5/1998 | Yoshida et al. | |
| 5,782,959 A | | 7/1998 | Yang et al. | |
| 5,783,608 A | | 7/1998 | Sugo et al. | |
| 5,804,128 A | | 9/1998 | Ogata et al. | |
| 5,882,461 A | | 3/1999 | Rogut | |
| 5,888,605 A | | 3/1999 | Hachisuka et al. | |
| 5,914,039 A | | 6/1999 | Mahendran et al. | |
| 5,972,501 A | | 10/1999 | Ohmory et al. | |
| 6,015,495 A | | 1/2000 | Koo et al. | |
| 6,024,872 A | | 2/2000 | Mahendran et al. | |
| 6,048,641 A | | 4/2000 | Ohmory et al. | |
| 6,077,376 A | * | 6/2000 | Kataro et al. | 156/195 |
| 6,083,393 A | | 7/2000 | Wu et al. | |
| 6,090,731 A | | 7/2000 | Pike et al. | |
| 6,114,017 A | | 9/2000 | Fabbricante et al. | |
| 6,127,433 A | | 10/2000 | Sugo et al. | |
| 6,148,865 A | | 11/2000 | Head | |
| 6,183,640 B1 | | 2/2001 | Wang | |
| 6,245,239 B1 | | 6/2001 | Cote et al. | |
| 6,264,044 B1 | | 7/2001 | Meyering et al. | |
| 6,273,271 B1 | | 8/2001 | Moya | |
| 6,280,791 B1 | | 8/2001 | Meyering et al. | |
| 6,354,443 B1 | | 3/2002 | Moya | |
| 6,354,444 B1 | | 3/2002 | Mahendran et al. | |
| 6,454,943 B1 | | 9/2002 | Koenhen | |
| 6,465,094 B1 | | 10/2002 | Dugan | |
| 6,495,663 B1 | | 12/2002 | Rothbard et al. | |
| 6,559,192 B2 | | 5/2003 | Maccone et al. | |
| 6,562,879 B1 | * | 5/2003 | Hatsuda et al. | 521/56 |
| 6,592,759 B2 | | 7/2003 | Rabie et al. | |
| 6,635,204 B2 | | 10/2003 | Tanaka et al. | |
| 6,746,627 B2 | | 6/2004 | Niu et al. | |
| 6,792,744 B2 | | 9/2004 | Feuerlohn et al. | |
| 6,802,971 B2 | | 10/2004 | Gorsuch et al. | |
| 6,890,435 B2 | | 5/2005 | Ji et al. | |
| RE39,176 E | * | 7/2006 | Dutt | 442/43 |
| 7,081,273 B2 | | 7/2006 | Ji | |
| 7,165,682 B1 | | 1/2007 | Ji | |
| 7,172,075 B1 | | 2/2007 | Ji | |
| 7,185,597 B1 | | 3/2007 | Phillips et al. | |
| 7,247,238 B2 | | 7/2007 | Mullette et al. | |
| 7,267,872 B2 | | 9/2007 | Lee et al. | |
| 7,306,105 B2 | | 12/2007 | Shinada et al. | |
| 7,413,804 B2 | | 8/2008 | Lee et al. | |
| 7,441,667 B2 | | 10/2008 | Galvin et al. | |
| 7,563,376 B2 | | 7/2009 | Oishi | |
| 7,776,214 B2 | | 8/2010 | Saito et al. | |
| 7,807,221 B2 | | 10/2010 | Shinada et al. | |
| 7,861,869 B2 | | 1/2011 | Beckers et al. | |
| 7,909,177 B2 | | 3/2011 | Lee et al. | |
| 8,529,814 B2 | * | 9/2013 | Palinkas et al. | 264/177.14 |
| 2002/0046970 A1 | * | 4/2002 | Murase et al. | 210/483 |
| 2002/0090690 A1 | | 7/2002 | Eddleman et al. | |
| 2002/0111674 A1 | | 8/2002 | Chouinard et al. | |
| 2002/0155289 A1 | | 10/2002 | Cistone et al. | |
| 2003/0094409 A1 | | 5/2003 | Minegishi et al. | |
| 2003/0098275 A1 | | 5/2003 | Mahendran et al. | |
| 2003/0107150 A1 | | 6/2003 | Hamanaka et al. | |
| 2003/0192826 A1 | | 10/2003 | Wang et al. | |
| 2003/0197308 A1 | | 10/2003 | Montoya | |
| 2004/0073300 A1 | | 4/2004 | Chouinard et al. | |
| 2004/0078903 A1 | | 4/2004 | Bruning et al. | |
| 2004/0136891 A1 | | 7/2004 | Yoshizawa et al. | |
| 2005/0124249 A1 | | 6/2005 | Uribarri | |
| 2005/0189292 A1 | * | 9/2005 | Ward et al. | 210/503 |
| 2005/0205488 A1 | | 9/2005 | Katsuhiko et al. | |
| 2006/0000766 A1 | | 1/2006 | Ji Jiang | |
| 2006/0175243 A1 | | 8/2006 | Mahendran et al. | |
| 2007/0084794 A1 | | 4/2007 | Morikawa et al. | |
| 2007/0262017 A1 | | 11/2007 | Shinada et al. | |
| 2007/0293132 A1 | | 12/2007 | Arnason | |
| 2008/0023125 A1 | | 1/2008 | Arnold et al. | |
| 2008/0210623 A1 | | 9/2008 | McMahon et al. | |
| 2008/0221668 A1 | | 9/2008 | Pinchuk et al. | |
| 2008/0241451 A1 | | 10/2008 | Beckers et al. | |
| 2008/0292823 A1 | | 11/2008 | Lee et al. | |
| 2008/0305290 A1 | | 12/2008 | Lee et al. | |
| 2009/0068428 A1 | | 3/2009 | Shinoda et al. | |
| 2009/0314708 A1 | * | 12/2009 | Yeom | 210/500.23 |
| 2010/0024631 A1 | | 2/2010 | Lee et al. | |
| 2011/0114553 A1 | | 5/2011 | Teramachi et al. | |
| 2012/0018371 A1 | * | 1/2012 | Cote | 210/500.23 |
| 2012/0097604 A1 | * | 4/2012 | Cote et al. | 210/500.23 |
| 2012/0156485 A1 | * | 6/2012 | Palinkas et al. | 428/365 |
| 2012/0164447 A1 | * | 6/2012 | Kohinata | 428/364 |

(56) References Cited

U.S. PATENT DOCUMENTS

| | | | |
|---|---|---|---|
| 2013/0153490 A1* | 6/2013 | Pedersen et al. | 210/500.23 |
| 2013/0158007 A1* | 6/2013 | Mickle et al. | 514/211.13 |
| 2013/0233788 A1* | 9/2013 | Vizvardi et al. | 210/490 |

FOREIGN PATENT DOCUMENTS

| | | |
|---|---|---|
| CA | 2474625 | 8/2003 |
| CA | 2478445 | 9/2003 |
| CA | 2478831 | 9/2003 |
| CA | 2630418 | 6/2007 |
| CH | 507012 | 5/1971 |
| CZ | 286263 B6 | 2/2000 |
| DE | 4142417 | 6/1992 |
| DE | 10211051 | 10/2003 |
| EP | 0241995 | 10/1987 |
| EP | 0761292 A1 | 3/1997 |
| EP | 0819467 | 1/1998 |
| EP | 0998972 | 5/2000 |
| EP | 1193292 | 4/2002 |
| EP | 1236503 | 9/2002 |
| EP | 1424157 A1 | 6/2004 |
| EP | 1658889 A1 | 5/2006 |
| EP | 0998972 B1 | 4/2007 |
| EP | 2043766 B1 | 2/2010 |
| EP | 2301654 | 3/2011 |
| FR | 1511581 | 2/1968 |
| FR | 2616812 | 12/1988 |
| FR | 2336962 | 7/1997 |
| GB | 1325672 A | 8/1973 |
| GB | 1374704 | 11/1974 |
| GB | 2041821 | 9/1980 |
| HU | 0300443 A | 6/2003 |
| HU | 008058 T2 | 2/2010 |
| JP | 53-039982 | 9/1974 |
| JP | 52137026 | 11/1977 |
| JP | 53028084 | 3/1978 |
| JP | 55137209 | 10/1980 |
| JP | 57005914 | 1/1982 |
| JP | 57-028139 | 2/1982 |
| JP | 58-004810 | 1/1983 |
| JP | 58-049408 | 3/1983 |
| JP | 58-093734 | 6/1983 |
| JP | 59196706 | 11/1984 |
| JP | 60137402 | 7/1985 |
| JP | 60139815 | 7/1985 |
| JP | 61-146811 | 7/1986 |
| JP | 62001404 | 1/1987 |
| JP | 62019206 | 1/1987 |
| JP | 62045318 | 2/1987 |
| JP | 62079806 | 4/1987 |
| JP | 62-133190 | 6/1987 |
| JP | 64-014315 | 1/1989 |
| JP | 2107318 | 4/1990 |
| JP | 2268816 | 11/1990 |
| JP | 04-265132 | 9/1992 |
| JP | 4265133 | 9/1992 |
| JP | 4293529 | 10/1992 |
| JP | 5301031 | 11/1993 |
| JP | 06-015152 | 1/1994 |
| JP | 06-246139 | 9/1994 |
| JP | 6246140 | 9/1994 |
| JP | 07-080263 | 3/1995 |
| JP | 07-116483 | 5/1995 |
| JP | 7157580 | 6/1995 |
| JP | 8165396 | 6/1996 |
| JP | 52082682 | 7/1997 |
| JP | 10-323546 | 12/1998 |
| JP | 11-319519 | 11/1999 |
| JP | 11348131 B2 | 12/1999 |
| JP | 2000-093768 | 4/2000 |
| JP | 2000288365 | 10/2000 |
| JP | 2001-062258 | 3/2001 |
| JP | 2003320584 A | 11/2003 |
| JP | 2008-114180 | 5/2008 |
| KR | 20040038473 A | 5/2004 |
| KR | 20110089621 A | 8/2011 |
| NL | 1010458 C2 | 4/2000 |
| TW | 200946323 A | 11/2009 |
| WO | WO 93/23153 | 11/1993 |
| WO | WO 99/01207 | 1/1999 |
| WO | 2009142279 | 11/1999 |
| WO | WO 00/78437 | 12/2000 |
| WO | WO 02/34373 | 5/2002 |
| WO | WO 03/059496 | 7/2003 |
| WO | WO 03/068374 | 8/2003 |
| WO | WO 03/076055 | 9/2003 |
| WO | WO 03/076056 | 9/2003 |
| WO | WO 03/097221 | 11/2003 |
| WO | WO 2004/009221 | 1/2004 |
| WO | WO 2004/089520 | 10/2004 |
| WO | WO 2005/002712 | 1/2005 |
| WO | 2005061081 | 7/2005 |
| WO | 2005082503 A1 | 9/2005 |
| WO | 2005-113218 A1 | 12/2005 |
| WO | 2005118116 A1 | 12/2005 |
| WO | WO 2006053406 | 5/2006 |
| WO | 2006063426 A1 | 6/2006 |
| WO | WO 2006063426 | 6/2006 |
| WO | WO 2007116072 | 10/2007 |
| WO | WO 2008066340 | 6/2008 |
| WO | 2010062454 | 6/2010 |
| WO | WO 2010/081228 | 7/2010 |
| WO | 2010108285 A1 | 9/2010 |
| WO | WO 2010/108285 | 9/2010 |
| WO | WO 2010/148517 | 12/2010 |
| WO | 2012036935 | 3/2012 |
| WO | 2012/067380 A2 | 5/2012 |

OTHER PUBLICATIONS

Search Report and Written Opinion from PCT/US2011/063332 dated Jul. 31, 2012.

Search Report and Written Opinion from PCT/US2011/050479 dated Nov. 25, 2011.

Search Report and Written Opinion from corresponding PCT Application No. PCT/US2012/065648 dated Mar. 28, 2013.

Murata Manufacturing Co, English language abstract of JP11348131, published Dec. 21, 1999.

Tsujino, Jiromaru et al., Welding of Flat Copper Braid Wire Specimens Using Ultrasonic Complex Vibratio—Direct Machining of Terminal Parts on Flat Braided Wires, Ultrasonics Symposium, IUS 2008. IEEE, Nov. 2-5, 2008.

Elke, English language abstract of EP1424157, published Jun. 2, 2004.

Inoue Shoten KK, English language abstract of JP2003320584, published Nov. 11, 2003.

Sung Cheol, English language abstract of KR20110089621, published Aug. 9, 2011.

Guo-Chang, English language abstract of TW200946323, published Nov. 16, 2009.

Schunk Ultraschalltechnik GmgH, English language abstract of CZ286263, published Feb. 16, 2000.

Caplan et al., Formation of microporous Teflon PFA membranes via thermally induced phase separation, Journal of Membrane Science, 130 (1997) p. 219-237.

Choi et al., Fabrication and characterization of multi-walled carbon nanotubes/polymer blend membranes, Journal of Membrane Science 284 (2006) p. 406-415.

Choi et al., Modification of Performances of Various Memranes Using MWNTs as a Modifier, Macromol. Symp. 2007, 249-250, p. 610-617.

English language abstact of JP 11-319519 to Nitto Denko Corp, published Nov. 24, 1999.

English language abstract of JP 04-265132 to Ube Ind Ltd, published Sep. 21, 1992.

English language abstract of JP 04265133 to Ube Ind Ltd, published Sep. 21, 1992.

English language abstract of JP 04293529 to Ube Ind Ltd, published Oct. 19, 1992.

(56) References Cited

OTHER PUBLICATIONS

English language abstract of JP 06-015152 to Tokuyama Soda Co Ltd, published Jan. 25, 1994.
English language abstract of JP 06-246139 to Dainippon Ink & Chem Inc, published Sep. 6, 1994.
English language abstract of JP 06246140 to Dainippon Ink & Chem Inc, published Sep. 6, 1994.
English language abstract of JP 07-080263 to Mitsubishi Rayon Co Ltd, published Mar. 28, 1995.
English language abstract of JP 07-116483 to Dainippon Ink & Chem Inc, published May 9, 1995.
English language abstract of JP 07157580 to Kawamura Inst of Chem Res Dainippon Ink & Chem Inc, published Jun. 6, 1995.
English language abstract of JP 08165396 to Kurabe Ind Co Ltd, published Jun. 25, 1996.
English language abstract of JP 10-323546 to Nitto Denko Corp, published Dec. 8, 1998.
English language abstract of JP 11-319519 to Nitto Denko Corp published Nov. 24, 1999.
English language abstract of JP 2000-093768 to Nok Corp, published Apr. 4, 2000.
English language abstract of JP 2000288365 to Torary Ind Inc, published Oct. 17, 2000.
English language abstract of JP 2001-062258, to Mitsubishi Rayon Co. Ltd, published 2001-03-2001.
English language abstract of JP 2008114180 to Mitsubishi Rayon Co Ltd, published May 22, 2008.
English language abstract of JP 2107318 to Daicel Chem, published Apr. 19, 1990.
English language abstract of JP 2268816 to Mitsubishi Rayon Co, published Nov. 2, 1990.
PCT Search Report dated Jun. 14, 2010 issued in connection with PCT Application No. PCT/CA2010/000469 which was filed on Mar. 26, 2010.
English language abstract of JP 52082682 to Asahi Chemical Ind, published Jul. 11, 1997.
English language abstract of JP 52137026 to Toyobo Co Ltd, published Nov. 16, 1977.
English language abstract of JP 5301031 to Daicel Chem, published Nov. 16, 1993.
English language abstract of JP 53028084 to Nitto Electric Ind Co, published Mar. 15, 1978.
English language abstract of JP 53-039982 to Kunyu, published Sep. 3, 1974.
English language abstract of JP 55137209 to Mitsubishi Rayon Co Ltd, published Oct. 25, 1980.
English language abstract of JP 57005914 to Mitsubishi Rayon Co Ltd, published Jan. 12, 1982.
English language abstract of JP 57-028139 to Asahi Chem Ind Co Ltd, published Feb. 15, 1982.
English language abstract of JP 58-004810 to Toyobo Co Ltd, published Jan. 12, 1983.
English language abstract of JP 58-049408 to Nitto Electric Ind Co Ltd, published Mar. 23, 1983.
English language abstract of JP 58-093734 to Asahi Kasei Kogyo KK, published Jun. 3, 1983.
English language abstract of JP 59196706 to Dainippon Ink & Chem Inc Kawamura Inst of Chem Res, published Nov. 8, 1984.
English language abstract of JP 60137402 to Mitsubishi Rayon Co Ltd, published Jul. 22, 1985.
English language abstract of JP 60139815 to Mitsubishi Rayon Co Ltd, published Jul. 24, 1985.
English language abstract of JP 61-146811 to Ube Ind Ltd, published Jul. 4, 1986.
English language abstract of JP 62001404 to Mitsubishi Rayon Co, published Jan. 7, 1987.
English language abstract of JP 62019206 to Dainippon Ink & Chem Inc, published Jan. 28, 1987.
English language abstract of JP 62045318 to Dainippon Ink & Chem Inc, published Feb. 27, 1987.
English language abstract of JP 62079806 to Ube Ind Ltd, published Apr. 13, 1987.
English language abstract of JP 62-133190 to Toagosei Chem Ind Co Ltd, published Jun. 16, 1987.
English language abstract of JP 64-014315 to Mitsubishi Rayon Co Ltd, published Jan. 18, 1989.
Ramaswamy et al., Fabication of poly (ECTFE) membranes via thermally induced phase separation, Journal of Membrane Science, 210 (2002) p. 175-180.
Lin et al., Microporous PVDF membrane formation by immersion precipitation from water/TEP/PVDF system, Desalination, 145 (2002) p. 25-29.
Lloyd et al., Microporous membrane formation via thermally-induced phase separation. II. Liquid-liquid phase separation, Journal of Membrane Science, 64 (1991) p. 1-11.
Lloyd, Douglas R., Microporous membrane formation via thermally induced phase separation. I. Solid-liquid phase separation, Journal of Membrane Science, 52 (1990) p. 239-261.
PCT Search Report dated Jun. 21, 2013 from PCT Application No. PCT/US2013/026979.
PCT Search Report and Written Opinion dated May 13, 2013 from PCT Application No. PCT/US2013/025110.
PCT Search Report dated Oct. 16, 2013 from PCT Application No. PCT/US2013/053891.
Novelty Search Report dated Jan. 8, 2015 from Hungarian Application No. P1400398.
Solvay, English language abstract of HU0300443 published Jun. 28, 2003.
Vlaamse Instelling Voor Technologisch Onderzoek, English language abstract of EP2043766 (Equivalent of HU008058).

\* cited by examiner

HOLLOW FIBER MEMBRANE WITH COMPATIBLE REINFORCEMENTS

FIELD

The field of this invention is hollow fiber membranes, for example hollow fiber membranes for use in providing water treatment by microfiltration or ultrafiltration.

BACKGROUND

Hollow fiber membranes can be made from a variety of polymers by different methods. One method involves non-solvent induced phase separation (NIPS) as taught for example in U.S. Pat. Nos. 3,615,024; 5,066,401; and, 6,024,872. Another method involves thermally induced phase separation (TIPS) as taught for example in U.S. Pat. Nos. 4,702,836 and 7,247,238. The membranes may have separation layers on their inner surfaces or their outer surfaces and may be used, for example, for microfiltration (MF) or ultrafiltration (UF).

The strength of a hollow fiber membrane can be increased by coating a membrane dope on a pre-formed tubular braid. U.S. Pat. Nos. 5,472,607 and 6,354,444 to Mahendran et al. teach coating a membrane on the outside of a braid with limited penetration. U.S. Pat. No. 4,061,861 to Hayano et al., U.S. Pat. No. 7,267,872 to Lee et al., and U.S. Pat. No. 7,306,105 to Shinada et al. also teach braid supported membranes. Hollow fiber membranes made according to the teachings of Mahendran et al. have been successfully commercialized.

Another approach that has been proposed for making a reinforced hollow fiber membrane involves embedding fibers within the wall of a hollow fiber while the hollow fiber is being cast. US Publication 2002/0046970 to Murase et al., International Publication WO 03/097221 to Yoon et al. and U.S. Pat. No. 6,454,943 to Koenhen describe methods of embedding a monofilament or a multi-filament yarn longitudinally within the wall of a hollow fiber. None of these methods have produced commercially available membranes.

Recent International Publications WO 2010/108285 and WO 2010/148517 by the present inventors teach forming cage like reinforcing structures within the wall of a hollow fiber while the hollow fiber is being cast. Filaments of the reinforcing structures may be bonded together at points of contact, for example by heat, UV light, or solvent bonding through a component of the filaments adapted to the bonding method.

INTRODUCTION

The following introduction is intended to introduce the reader to the detailed description to follow and not to limit or define the claims.

In experiments with hollow fiber membranes reinforced with longitudinal yarns, the inventors observed a failure mode in which the yarns broke through the wall of the membranes. The yarns were initially enveloped in the membrane walls, but as the membranes swayed during air scouring the yarns appeared to cut through the membrane wall. The cage like structures described in International Publications WO 2010/108285 and WO 2010/148517 avoid this problem by adding spirally wrapped or other oblique filaments. This specification will describe an alternative reinforced membrane, and method of making it.

A hollow fiber membrane described in this specification is reinforced by one or more multi-filament yarns or tows embedded in a membrane dope flowing through a casting head. The filaments are made, at least in part, of a polymer that is adapted to bond to the membrane dope or the solidified membrane wall. For example, the polymer may be soluble in the membrane dope, may melt in the membrane dope, or may have its surface treated to promote bonding. The filaments of the yarns or tows are spread apart, for example by forcing them around a bend or through a narrow gap in the casting head. The dope is able to penetrate the yarns or tows, surrounding and bonding to individual filaments. Because substantially all of the individual filaments are adhered to the membrane wall, the filaments resist moving within the membrane wall and do not cut their way out of the membrane during normal use.

A process of making the reinforced hollow fiber membrane comprises flowing a membrane dope through a casting head while drawing one or more yarns or tows of filaments through the casting head. The yarns or tows may be forced around a bend or through a narrow gap in the casting head. The filaments are adapted to bond with the membrane dope or the solidified membrane wall.

A reinforced hollow fiber membrane comprises one or more yarns or tows, each comprising a plurality of filaments individually surrounded by and bonded to the membrane wall.

DETAILED DESCRIPTION

Figure 1:
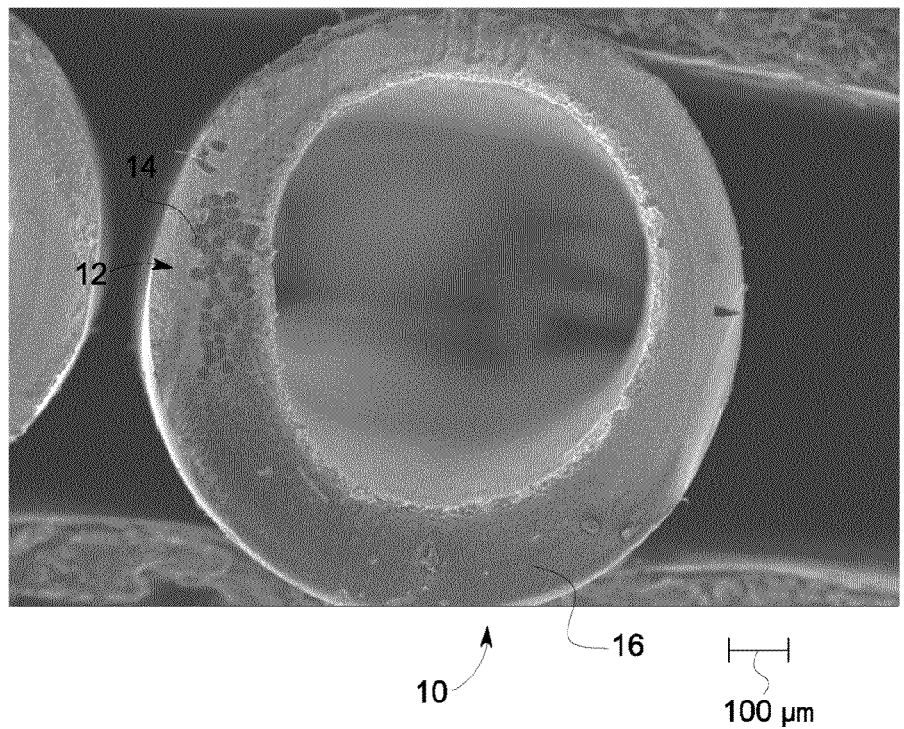
FIG. 1 is a photograph of a cross section of a hollow fiber membrane reinforced with bi-component filaments.

Referring to FIG. 1, a hollow fiber membrane 10 has a membrane wall 16. The membrane 10 may have any size but the structure of the membrane 10 is particularly useful in making a membrane that is small and thin walled relative to other reinforced membranes. For example, the outside diameter of the membrane 10 may be about 1.5 mm or less, with a wall thickness of about 0.25 mm or less. The membrane 10 shown has an outside diameter of about 0.9 mm and an inside diameter of about 0.7 mm.

The membrane wall 16 has one or more tows 12 of filaments 14 embedded in it. The filaments 14 are long continuous fibers such that at least most, or about 80% or more, of the filaments 14 have a length of at least one meter. When segments of a membrane 10 at least one meter long are potted in a membrane module, at least most of the filaments 14 are continuous along the entire length of the segments. Preferably, all or essentially all of the filaments 14 are continuous along the entire length of the segments.

The specific membrane 10 shown in FIG. 1 has one tow 12, but there may be a plurality of tows 12, for example between two and eight. The word "tow" is used as in the composites industry to indicate a generally untwisted bundle of continuous man-made filaments, or at least long segments of filaments. However, the tow 12 typically has less than about 200 filaments 14 per tow 12 whereas tows in the composites industry may have thousands of filaments. The word "tow"

may also refer to a filament yarn made of continuous manmade filaments, or at least long segments of filaments, grouped together but without sufficient twisting to be classified as a twisted yarn. Other types of yarns or threads might also be used, but they are not preferred.

While the tow 12 is a textile unit that can be drawn from a spindle and pulled through a casting head, the filaments 14 are at most only loosely intertwined in the tow 12. The filaments 14 may be spread apart from each other as shown in FIG. 1 such that membrane dope can flow between at least most pairs of adjacent filaments 14. Although filaments 14 may occasionally or randomly cross each other, the filaments 14 are generally parallel to each other along the length of the membrane 10. The tow 12 may have an initial shape that is generally cylindrical, and with a diameter that is larger than the thickness of the wall 16, but the filaments 14 are spread out into a cross section that fits within the wall 16.

Filaments 14 can be made from polymeric fibers such as polyethylene, polypropylene, polyester, nylon or PVDF. Filaments can be bi-component filaments with a first part, preferably a complete outer layer or sheath, made of a first polymer that is adapted for bonding to a membrane forming dope. Bonding may be by way of partially dissolving the outer layer or other part of the filament 14 with a solvent in the dope. For example, a reinforcing filament 14 may have an outer layer or other part made of a polymer that is soluble in a solvent used in the membrane dope. In particular, the outer layer or other part may comprise a polymer that is also present in the membrane dope. A second part, for example a core, of a bi-component filament 14 is made of second polymer that is compatible with the first polymer. The second polymer may be chosen to provide an improvement over using the first polymer alone. For example, the second polymer may be stronger, or less expensive, or both, relative to the first polymer. Either or the first or second polymers may be copolymers selected to increase their ability to be spun together into a bi-component filament 14.

The filaments 14 shown in FIG. 1 are bi-component fibers spun with one part being polyethylene terephthalate (PET) and the other part being polyvinylidene fluoride (PVDF). The bi-component filaments 14 are assembled into a tow 12 of 220 denier (g/9000 m). This tow 12 was made of 36 filaments 14, each of about 6 denier. Each filament 14 has a core of PET and a sheath of PVDF, the core being about 70-90% of the cross-sectional area. The core may be made of a lower melting temperature co-PET to more closely match the PVDF processing temperature. The sheath layer of PVDF is approximately 1-2 microns thick. Tows can also be made with other numbers and weights of filaments.

Polyvinylidene fluoride (PVDF) based membrane dopes are compatible with the filaments 14 described in the paragraph above and may be used to form the membrane wall 16 using a NIPS process. Such a dope may be prepared by dissolving PVDF into hot NMP and adding a small amount of a non-solvent. The dope may have 80-84 wt % NMP, 14-16 wt % PVDF and 2-4 wt % PVP k30. The polymer concentration and temperature can be varied to adjust dope viscosity.

In the membrane 10 of FIG. 1, the filaments 14 are made with an outer sheath layer that is chemically compatible with the material of the membrane wall 16 and a stronger core polymer. For example, PET is a strong material that is easily formed into filaments 14 and has mechanical characteristics suitable for reinforcing or supporting membranes. PVDF by comparison is a relatively weak material that is not easily formed into yarns. However, the core and sheath bi-component filaments 14 of FIG. 1 are both well bonded to the membrane wall 16 and mechanically strong.

The tensile strength of the membrane 10 is determined primarily by the sum of the tensile strengths of the cores of the filaments 14. For example, the 220 denier tow 12 described above has a break strength of about 7 N, which is provided primarily by the PET core. A PVDF membrane with a 1.0 mm outside diameter and a 0.7 mm inside diameter also has a break strength of about 7 N per tow 12 provided in the membrane 10. In comparison, the same size fiber without reinforcement breaks at less than 2 N.

In a membrane formed by a TIPS process, filaments may have at least a part with a melt temperature that allows them to at least partially melt in a heated membrane dope. These filaments become melt bonded to the membrane wall. For example, a bi-component filament can be spun from an Eastman F61HC polyethylene terephthalate (PET) homopolymer (melting point 260° C.) core and a Dupont 3632 coPET (melting point 160° C.) sheath. This bi-component filament can be assembled into tows. The core may be 50% to 80% of the cross-sectional area. The coPET sheath is partially melted when it is embedded in a heated dope of a TIPS process and becomes melt bonded to the membrane wall during spinning.

The surface of filaments, including single polymer filaments, may also be modified or treated before the membrane dope is cast around them to promote bonding to the membrane dope. Such treatments can include, for example, plasma or chemical etching. The treatment is chosen to be appropriate for the materials of the yarn and the dope.

The filaments 14, including bi-component filaments 14, may be pre-shrunk or heat treated before they are embedded in the wall 16. A heater, for example using hot air or a heated guide, may be provided to heat the tow 12 as it is carried to a coating head to pre-shrink or treat the filaments 14. Alternatively, the tow 12 or individual filaments 14 may be pre-shrunk or heat treated in one or more separate steps before the filaments 14 are assembled into a tow 12 or before a tow 12 is wound on a bobbin for feeding to the coating head.

A heating zone may comprise a 4 cm diameter by 60 cm long tubular chamber with openings at the top and bottom so the axis of the heating zone can be aligned with a direction of travel of a tow 12 or filament 14. The tubular chamber also has a side connection to an air blower and a heating element. The air temperature can be controlled by varying the current draw of the heating element.

Depending on the time and temperature in the heating zone and any tension on the filaments 14, the filaments 14 will shrink or be heat set or both. However, the filaments 14 should not be heated to such an extent that they may start to bond with each other. The air temperature may be, for example, between about 100 and 200 degrees C. The contact time may be between about 0.1 and 5.0 seconds.

Preferably, the filaments 14 are heat set by being put under tension to elongate the filaments 14 while exposing the filaments 14 to a temperature higher than the temperature of the dope, and higher than any temperature that the membrane 10 will encounter in use. The filaments 14 are then allowed to cool to about room temperature while still being held in the elongated state. This helps avoid separation between the components of the filaments 14 when the membrane 10 is made or put in use.

To handle the tows 12 while the membrane 10 is made, one or more bobbins, each wound with a tow 12, are placed on a creel typically located beside or above the casting head. The creel consists of stationary bobbin holders, guides and tensioning devices, as found in conventional textile equipment. The tows 12 pass through a distribution die which has a series of alignment eyelets evenly distributed around an extension of a central axis of the casting head.

Figure 2A:
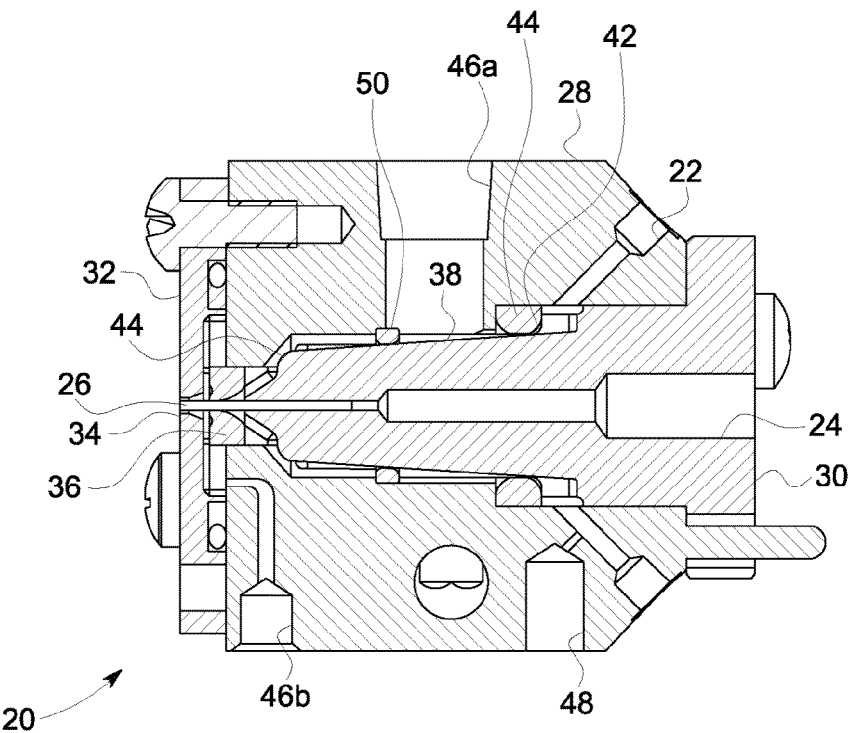
FIG. 2A is a schematic cross section of a coating head.

FIG. 2A shows a casting head 20, alternatively called a coating head or a spinneret. The casting head 20 may be made in three primary parts, a body 28, a needle holder 30 and a button 32. The button 32 is attached to one side of the body 28 and has a die 34, typically a cylindrical hole, forming the final outer casting surface of the casting head 20. The needle holder 30 holds a needle 26 and is inserted into the opposite side of the body 28 such that the needle 26 enters the die 34. The end of the needle 26 is typically flush with the end of the die 34, although one may also be displaced relative to the other. The needle 26 and die 34 create an annular ring that the membrane dope and tows 12 pass through. The needle 26 and die 34, in combination with the flow rates of a bore fluid and the dope, determine the inside and outside diameter of the resulting membrane 10.

The needle 26 is pressed into a central bore 24 of the needle holder 30. The needle 26 and central bore 24 are aligned with the central or longitudinal axis of the casting head 20 and provide a conduit for injecting a bore fluid into the membrane 10 as it is being formed. The outer diameter of the needle 26 and needle holder 30 also provide an inner surface for the dope and tow 12 to flow along as they pass through the coating head 20.

Figure 2B:
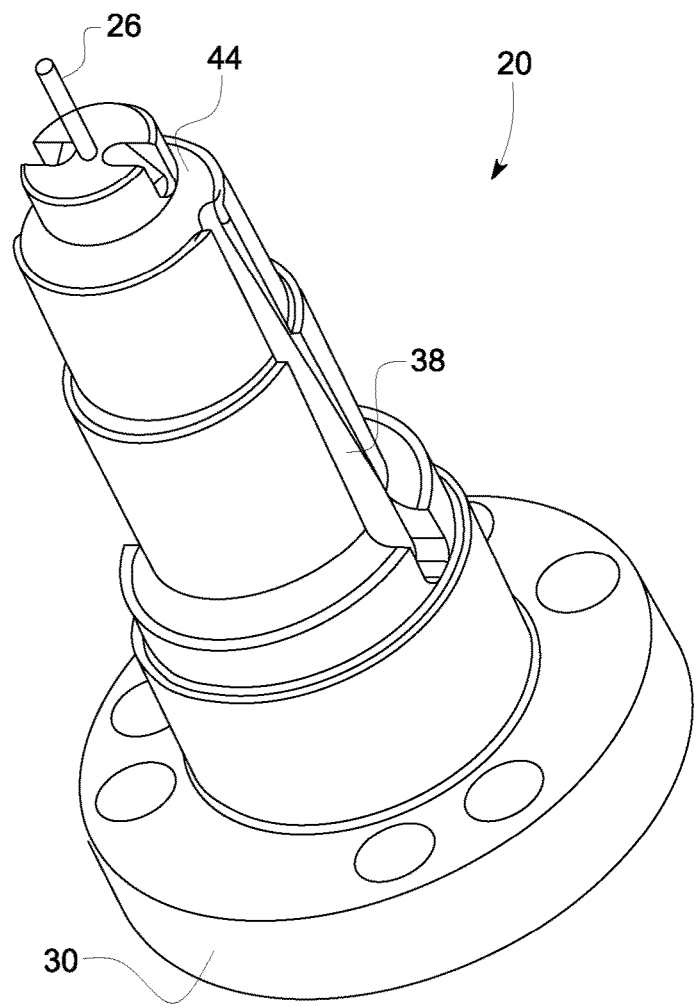
FIG. 2B is an isometric view of a needle holder and needle of the coating head of FIG. 2A.

Referring to FIGS. 2A and 2B, the needle holder 30 has a trough 38 for each tow 12 that will travel through the casting head 20. The body 28 has one or more tow inlets 22, each corresponding to a trough 38, for receiving the desired number of tows 12 and transferring them to a trough 38. Typically only one tow 12 passes through each tow inlet 22 and into a corresponding trough 38, but two or more tows 12 may be combined through one tow inlet 22 and trough 38. Further, a casting head 20 with multiple tow inlets 22 can be used without providing a tow 12 through every tow inlet 22 available.

The tow inlets 22 are preferably set at an angle, for example 30 degrees or more, to the central axis of the casting head 22. A tow 12 must bend around a corner 42 provided on the body 28, or on an optional first eyelet 44 inserted in the body 28, as it moves from a tow inlet 22 to a trough 38. The trough 38 is preferably also interrupted by a ledge 40 that forces the tow 12 to bend again as it travels through the casting head 20. The tow 12 bends again as it enters the die 34, or an optional separate third eyelet 36. The upstream edge of the corner 42, the ledge 40, and the die 34 or third eyelet 36, whichever surface or surface bear against the tow 12 as it bends, preferably have a radius of 1 mm or more and are machined to a smooth polish. One or more of the corner 42, ledge 40, die 34 or third eyelet 36 spread the filaments 14 such that the tow 12 becomes wider and thinner relative to its initial circular cross section, as shown in FIG. 1. The spreading of the filaments 14 may be alternatively provided or enhanced by having narrow gaps between one or more of the corner 42 and the bottom of the trough 38, between an optional second eyelet 50 and the bottom of the trough 38, and between the die 34 or third eyelet 36 and the needle 26.

The body 28 also includes dope injection ports 46 and drains 48. A set of one or more first ports 46a allow dope to be injected into the troughs 38. The rate of flow of dope through the first ports 46a is preferably sufficient to keep the troughs 38 full of dope such that the filaments 14 are wetted with dope before they contact the needle 26. If insufficient dope is provided through the first ports 46a, then the filaments 14 will tend to fall into the lumen of membrane 10 and the membrane 10 will be defective. Some dope entering through first ports 46a will be forced upstream around corner 42. This dope is drained through the drains 48 which communicate one with each of the tow inlets 22. Additional second ports 46b admit dope into the gap between the die 34 and the needle 26. This additional dope completes the required total flow of dope needed to form the membrane wall 16. Dope can be injected into the ports 46 from a pot pressurized with nitrogen, or using a positive displacement pump. The dope may be provided at a temperature in the range of about 15 to 200 degrees C. and at a pressure in the range of about 20 to 400 kPa.

A tubular stream of membrane dope with entrained filaments 14 exits the coating head 20 and drops into a coagulation bath. The coagulation bath is typically a tank equipped with rollers at the bottom and at the top as is known for membrane coagulation. A take-up winder after the top roller has an adjustable speed of between 1 and 30 m/min and a traverse guide to evenly populate a bobbin with the coagulated membrane.

Figure 4:
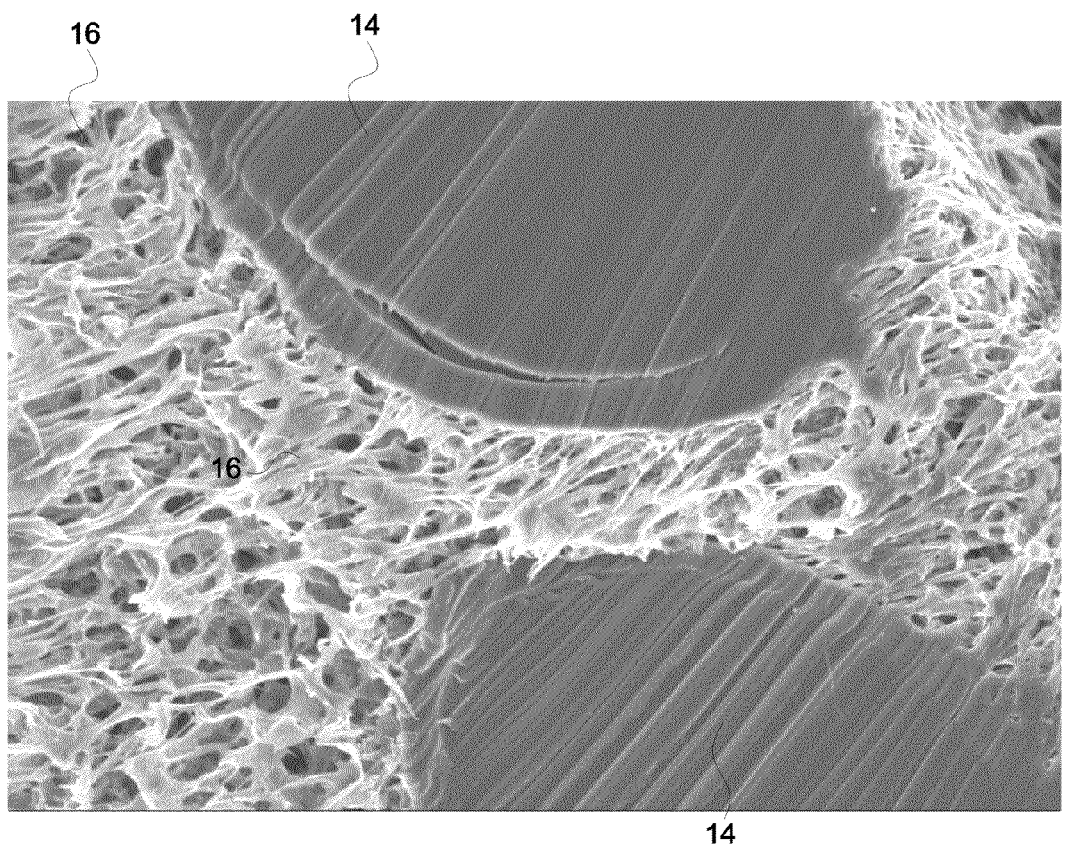
FIG. 4 is a photograph of a part of a cross section of a hollow fiber membrane reinforced with bi-component filaments at a higher magnification than in FIG. 1.

Referring to FIG. 4, examination of the membrane 10 under scanning electron microscopy (SEM) photographs show the PVDF based membrane wall 16 to be well adhered to the individual filaments 14 within a multi-filament tow 12. In FIG. 4 it can be seen that the dope penetrates between the filaments 14 and is cohesively bonded to the surface of the filaments 14. There is evidence of some delamination within the bicomponent fibre between the PVDF and PET layers. This was caused by cutting the sample.

Figure 3:
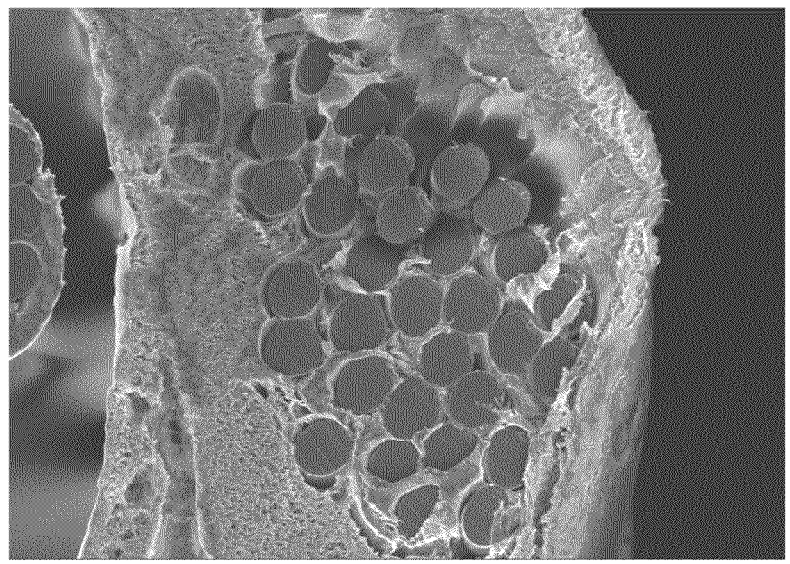
FIG. 3 is a photograph of a cross section of a hollow fiber membrane with polyester filaments.

In comparison, FIG. 3 shows that the membrane dope can also be made to penetrate between the filaments of a 133 denier tow of PET filaments using the casting head 20. However, the dope in this case did not bond to the filaments. Instead, the dope shrank away from the filaments as it solidified leaving the filaments free to move within the membrane when it is flexed.

By using a sheath material compatible with the membrane dope so that the membrane wall 16 adheres to the filaments 14, and by distributing the filaments 14 in the coating head 20 so that the filaments 14 are spread apart adequately to allow the membrane dope to penetrate between substantially all of them, a tough reinforced hollow fiber membrane 10 is produced that is durable to the flexing motion of regular use. The result is a more durable and break resistant membrane filtration device.

The filaments 14 add essentially no cost to the membrane. In contrast, compared to an unsupported membrane which will have a thicker wall section in an attempt to improve its strength, a thinner walled but reinforced membrane can yield a lower cost module on a surface area basis.

A single component filament may be used that is compatible with the selected membrane dope. However, such filaments are likely to be more expensive or weaker, or both, than the bicomponent yarn with PET or another strong textile polymer as the core material. In particular, PVDF and polyethersulfone (PES) are preferred membrane materials but do not make good reinforcing yarns because they are weaker and substantially more expensive than PET.

EXAMPLE

The membrane 10 shown in FIG. 1 was made using a dope that was primarily a PVDF/NMP mixture supplied into the gap between the die 34 and the needle 26 at a rate of 28 cc/min, and to a trough 38 at 3 cc/min. The casting head 20 was as shown in FIGS. 2A and 2B and was heated to 60 degrees C. One tow 12 was employed having bicomponent filaments 14 of the sheath/core type. The composition of the filaments 14 was 70% by weight of a PET core (Eastman F61HC) and 30% by weight of a PVDF sheath (Solef 1006). The tow 12 comprised 36 non-twisted filaments 14 each of 6 denier weight. The line speed was 15 m/min (50 fpm), the air gap was 110 mm and the coagulation bath was water at 45 degrees C.

This written description uses examples to disclose the invention and also to enable any person skilled in the art to practice the invention. The scope of the invention is defined by the claims, and may include other examples that occur to those skilled in the art.

The invention claimed is:

1. A hollow fiber membrane comprising:
   a) a membrane wall formed from a membrane dope; and
   b) one or more yarns or tows of filaments embedded in the membrane wall;
   wherein the filaments are made, at least in part, of a polymer that is adapted to bond to the membrane dope or the membrane wall; and
   wherein the one or more yarns or tows of filaments embedded in the membrane wall have a cross-sectional shape perpendicular to the length of the membrane that is larger when measured perpendicular to a radius of the membrane that when measured parallel to the radius of the membrane, and
   wherein a cylindrical bundle of the filaments has a diameter that is greater than the thickness of the membrane wall.

2. The membrane of claim 1 wherein the polymer is provided in a sheath around a core of the filament, and the core is made of a different polymer.

3. The membrane of claim 1 wherein the polymer is soluble in a solvent used in the membrane dope.

4. The membrane of claim 1 wherein the polymer is a polymer that is also present in the membrane dope.

5. The membrane of claim 1 wherein the polymer is PVDF.

6. The membrane of claim 5 wherein the filaments have a core of PET or co-PET.

7. The membrane of claim 1 wherein the polymer is PES.

8. The membrane of claim 1 wherein the polymer has a melt temperature below the temperature of a TIPS dope used to form the membrane wall.

9. The membrane of claim 1 wherein the polymer has a surface treated to promote bonding.

10. The membrane of claim 1 wherein the membrane wall surrounds and is bonded to the filaments.

11. The membrane of claim 1 wherein at least most of the filaments extend continuously from one end to the other of a segment of the membrane that is at least 1 meter long and the filaments are generally parallel to each other.

12. A process of making a reinforced hollow fiber membrane comprising the steps of,
   a) flowing a membrane dope through a casting head;
   b) drawing one or more yarns or tows of filaments through the casting head, the filaments initially forming a generally cylindrical bundle before they enter the casting head; and,
   c) forcing the one or more yarns or tows filaments around at least one bend in the casting head, or through at least one gap in the casting head that is narrower than the initial cylindrical bundle of the filaments, such that the one or more yarns or tows are flattened relative to the initial generally cylindrical bundle.

13. The process of claim 12 wherein the filaments comprise a core of a first polymer and a sheath of a second polymer.

14. The process of claim 13 comprising a step of heat setting the filaments before step b).

15. The process of claim 13 wherein the second polymer is a polymer also provided in the dope.

16. The process of claim 15 wherein the first polymer comprises PET.

17. The process of claim 12 wherein step a) comprises providing dope in a first zone of the casting head in which a tow travels in a trough upstream of a die, and providing dope in a second zone in communication with the die.

18. The process of claim 12 further comprising a step of providing a bore fluid to a lumen of the membrane.

19. A reinforced hollow fiber membrane comprising a membrane wall and one or more tows cast into the membrane wall, each tow comprising a plurality of generally parallel continuous filaments, wherein the filaments of the tow are spread apart such that the membrane wall extends between at least most pairs of adjacent filaments within the tow, and wherein the filaments comprise a Polymer present in the membrane wall.

* * * * *